3,681,325
DE(N-METHYL)-N-SUBSTITUTED DERIVATIVES
OF ERYTHROMYCIN
Leslie Alan Freiberg, Waukegan, Ill., assignor to Abbott
Laboratories, North Chicago, Ill.
No Drawing. Filed Sept. 30, 1970, Ser. No. 77,051
Int. Cl. C07c 47/18
U.S. Cl. 260—210 E                8 Claims

ABSTRACT OF THE DISCLOSURE

New derivatives of erythromycin A and B, having antimicrobial activity of the formula

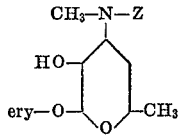

wherein Z is benzyl; halo, nitro, amino, loweralkyl, loweralkoxy, carboxybenzyl, haloloweralkyl, diloweralkylaminomethyl, carboxyl, loweralkoxymethyl, cyano and hydrocarbylene substituted benzyl; allyl, loweralkyl and phenylsubstituted β and γ allyl, e.g., crotyl; cyano; and cyanoloweralkyl; and ery is the cladinose and erythronolide moieties of erythromycin.

DISCLOSURE OF THE INVENTION

This invention relates to derivatives of the antibiotic erythromycin which have antimicrobial activity. It especially relates to de(N-methyl)-N-substituted derivatives of erythromycin which have the general formula:

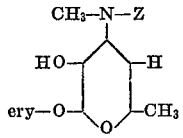

wherein only the desosamine moiety is shown in its entirety, ery representing both the erythronolide and cladinose moieties of erythromycin A and B.

Although the complete formula for erythromycin is not set forth, erythromycin A differs from erythromycin B only in that hydroxy rather than hydrogen is present at the 12-position of the erythronolide ring. Irrespective of this difference, erythromycin A and erythromycin B are interchangeable as reactants for preparing the derivatives of this invention.

In the above formula Z is

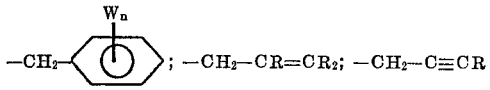

and

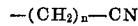

wherein $W_n$ is one or more similar or dissimilar members selected from halogen, that is chloro, bromo and iodo, nitro, amino, cyano, loweralkyl such for example as methyl, ethyl, iso-propyl etc., carboxybenzyl, loweralkoxy, such for example as methoxy, ethoxy, propoxy, haloloweralkyl, for example chloromethyl, chloropropyl, bromoethyl, diloweralkylaminomethyl such as methyl-ethylaminomethyl, loweralkoxymethyl, carboxyl and when substituted on adjacent (vicinal) carbon atoms of the benzyl ring, two $W_n$ groups can be combined to form a hydrocarbylene chain, e.g., a chain containing only hydrogen and carbon such as 1,3-butadienylene,

where R is hydrogen, phenyl and loweralkyl; and where n is an integer having a value of 0–3 inclusive.

Clark and Freifelder in Antibiotics and Chemotherapy 8:483; September 1957, disclose de(N-methyl)-N-loweralkyl erythromycin and de-N-methyl-γ-phenylpropyl erythromycin together with a method for their preparation. The new compounds of this invention, while N-substituted derivatives of erythromycin, are found to have antibiotic activity not anticipated by the limited series theretofore disclosed.

It has now been found that by reacting de(N-methyl)-erythromycin A or B, depending on whether the A or B derivative of the product is desired, with a compound of the formula X—Y, the novel and useful erythromycin derivatives of this invention or their immediate precursors can be obtained. In the formula X—Y, X is halogen, either chloro, bromo or iodo, and Y is the equivalent of Z, except that the definition of Y excludes the instances where $W_n$ is amino and diloweralkylaminomethyl, which latter derivatives, as will be seen, are obtained from the reduction of the corresponding de(N-methyl)N-nitrosubstituted benzylerythromycin derivatives or by addition of diloweralkylamine to the de(N-methyl)-N-chloromethyl substituted benzyl erythromycins.

In carrying out the reaction between X—Y and de(N-methyl)erythromycin, the latter reactant in the A or B form can be obtained in accordance with the method set forth in U.S. Pat. 2,812,323. The reaction between X—Y and de(N-methyl)erythromycin A or B is suitably performed at temperatures ranging from −30° C. to +45° C. Preferably, however, the reaction is best carried out between 20° C. and 30° C.

The duration of the reaction period required for the completion of the reaction ranges from 16 hours at 25° C. for the preparation of de(N-methyl)-N-benzylerythromycin A from benzyl chloride to 960 hours at 25° C. for the preparation of de(N-methyl)-N-o-nitrobenzylerythromycin A from o-nitrobenzyl chloride. Generally, the reaction is complete after 200 hours. It should be borne in mind that these time periods refer to substantially complete reactions and lesser reaction time will result in the formation of some product, although not the maximum that could be obtained by an extended reaction period.

The preparation of the de(N-methyl)-N-substituted erythromycins by the reaction of de(N-methyl)erythromycin with X—Y is usually carried out in a solvent medium. Any inert solvent which is a solvent for one of the reactants and advantageously for both reactants can be utilized. The term "'inert" is meant to include only those solvents that either undergo no irreversible reaction with the reactants or products, or react either at such a rate that by-product formation is negligible or in such a way that by-product formation is controlled by the conditions of reaction.

Methanol is the preferred solvent although other solvents, such as the other lower alcohols, dimethylsulfoxide, and N,N-dimethylacetamide, can also be used to advantage.

While methanol is the preferred solvent, it can, especially at elevated temperatures, react with X—Y, forming Y—OCH$_3$ and the acid HX. Acid formation should be controlled for two reasons. One reason is that acid can cause degradation of the erythronolide ring, the other reason being that it can protonate the de(N-methyl)-erythromycin as shall be discussed later.

So as to insure against such potentially harmful effects of acid, a buffer can be employed. A preferred buffer is a base such as the salt of a strong base and a weak acid, sodium acetate being preferred. The addition of about 4 to about 7 equivalents of buffer for each equivalent of the basic de(N-methyl)erythromycin has been found sufficient.

As mentioned previously, acids can protonate the basic reactant de(N-methyl)erythromycin. The reaction initially produces de(N-methyl)-N-substituted erythromycin in the salt form. Therefore, a proton can transfer from this salt and protonate the stronger base, de(N-methyl)erythromycin. As the reaction progresses, more reactant can become protonated and halt the reaction prematurely prior to the utilization of all reactants. The inclusion of the buffer liberates any protonated species of reactant and promotes completion of the reaction.

Although the reaction between de(N-methyl)erythromycin and X—Y requires only an equimolar quantity of each reactant, it is desirable to employ an excess of one reactant, preferably an excess of X—Y. In the preferred method of preparation, X—Y is used in a ratio of 2–5 moles of X—Y of each mole of de(N-methyl)erythromycin.

Because the reaction appears to be a second order reaction, the rate of formation of product being a function of the concentration of the reactants, such an excess of X—Y would appear to enhance the reaction rate. The formation of product as a quaternary salt, however, is not a serious problem, even with a large excess of X—Y because of bulking effect of the added substituent in the product together with its decreased nucleophilicity deters quaternary salt formation.

The novel de-N-methyl-N-substituted erythromycin derivatives of this invention are characterized by an antibacterial spectrum similar to that of erythromycin. These derivatives are useful as active ingredients of stable medicaments suitable for parenteral, topical and oral administration. In addition, they can be used in an aqueous solution as a disinfectant for various medical equipment where the surface of such equipment which is contaminated with *Staphylococcus aureus* is swabbed with a derivative of this invention at a concentration of at least in excess of its minimum inhibitory concentration, a concentration of 100–200 micrograms/ml. being satisfactory.

Reference to Table 1 will further illustrate the antibacterial characteristics of the compounds of this invention. Only the substituent Z is shown in the table, it being understood that Z is part of a compound as shown in the above formula.

The following specific examples are illustrative of the compounds of this invention together with the methods used to produce them.

EXAMPLE 1

De(N-methyl)-N-p-methylbenzylerythromycin A

To a mixture of 4.00 g. (5.55 mole) of de(N-methyl)-erythromycin A and 3.02 g. (22.2 mole) of sodium acetate trihydrate dissolved in 40 ml. of absolute methanol is added 3.06 g. (16.5 mole) of α-bromo-p-xylene. The mixture was stirred at 25° for 24 hours and then poured into 200 ml. of water made basic with 10 ml. of concentrated ammonium hydroxide. The mixture was then extracted with four 50 ml. portions of chloroform. The combined chloroform layers were washed with 50 ml. of water containing 2.5 ml. of concentrated ammonium hydroxide, were dried over anhydrous sodium sulfate, and were then concentrated to give 7.43 g. of crude product mixture which was immediately purified by chromatograph as follows:

A column of 60 g. of Florisil was prepared in benzene and made basic by eluting with 1.0 liter of benzene: 0.3% triethylamine. Fractions sizes were 125 ml. and all eluents contained 0.3% triethylamine. The following fractions were collected.

| Fraction | Eluate (mg.) | Eluent |
| --- | --- | --- |
| 1 | 2,300 | Benzene. |
| 2 | 317 | Do. |
| 3 | 241 | Do. |
| 4 | 156 | Do. |
| 5 | 138 | Do. |
| 6 | 103 | Do. |
| 7 | 90 | Do. |
| 8 | 64 | Do. |
| 9 | 68 | Do. |
| 10 | 1,064 | Benzene:2% methanol. |
| 11 | 841 | Do. |
| 12 | 50 | Do. |
| 13 | 13 | Do. |

Fractions 2–13 were combined and dissolved in 15 ml. of absolute ethanol and 10 ml. of water was added to a slight turbidity. After standing until crystallization was complete the crystals were collected and dried, wt. 1.30 g., M.P. 155–161°.

*Analysis.*—Calc. for $C_{44}H_{73}NO_{13}$ (mol. wt., 824.074) (percent): C, 64.13; H, 8.93; N, 1.70; O, 25.24. Found (percent): C, 64.07; H, 9.09; N, 1.60; O, 25.07.

In an analogous manner, compounds represented by the following examples, 2 through 36, were prepared. The notation "*t*" refers to the duration of the reaction in hours; while the notation "reactants" denotes the composition of the reactant X—Y and whether the de-N-methyl erythromycin A or B was the starting material, i.e., "A" or "B". Furthermore, the notation "product" only identifies the Z substituent of de-N-methyl-N substituted erythromycin A or B. The melting point of the product is shown under the heading "M.P." in degrees centigrade. Unless otherwise indicated, all reactions were carried out at 25° centigrade.

TABLE I.—IN VITRO MINIMUM INHIBITORY CONCENTRATION Mcg./ml. AGAR DILUTION
pH 7.4

| Z | Staphylococcus aureus | Streptococcus faecalis | Klebsiella pneumoniae | Mycoplasma gallisepticum | Mycoplasma pneumoniae |
| --- | --- | --- | --- | --- | --- |
| p-Methylbenzyl | 3.1 | 1.56 | 100 | 5 | 1.0 |
| m-Chlorobenzyl | 1.56 | 0.39 | 12.5 | 0.25 | 5.0 |
| m-Methylbenzyl | 0.39 | 0.2 | 6.2 | 0.1 | 0.5 |
| p-Chlorobenzyl | 3.1 | 1.56 | 100 | 2.5 | 5.0 |
| Benzyl | 0.39 | 0.2 | 6.2 | 0.1 | 1.0 |
| m-Nitrobenzyl | 0.78 | 0.78 | 25 | 1.0 | 5.0 |
| p-Nitrobenzyl | 0.39 | 0.78 | 100 | 2.5 | 5.0 |
| Allyl | 0.78 | 0.39 | 12.5 | 1.0 | 0.25 |
| Crotyl | 0.78 | 0.2 | 6.2 | 0.25 | 0.5 |
| o-Methylbenzyl | 0.39 | 0.2 | 12.5 | 0.05 | 0.25 |
| p-Fluorobenzyl | 0.39 | 0.39 | 12.5 | 0.25 | 0.5 |
| β-Methyl allyl | 0.39 | 0.1 | 12.5 | 0.5 | 0.1 |
| m-Fluorobenzyl | 0.78 | 0.2 | 12.5 | 0.1 | 1.0 |
| 2,5-dimethylbenzyl | 0.39 | 0.39 | 12.5 | 0.25 | 0.5 |
| p-Cyanobenzyl | 1.56 | 0.39 | 50 | 1.0 | 5.0 |
| 2,4,6-trimethylbenzyl | 6.2 | 0.39 | 100 | 1.0 | 5.0 |

| Example | t | Reactants | A or B | Product | M.P. |
|---|---|---|---|---|---|
| 2 | 48 | m-Chlorobenzyl chloride | A | m-Chlorobenzyl | 127-131 |
| 3 | 16 | m-Methylbenzyl bromide | A | m-Methylbenzyl | 116-121 |
| 4 | 48 | p-Chlorobenzyl bromide | A | p-Chlorobenzyl | 140-152 |
| 5 | 18 | 2,5-dimethylbenzyl chloride | A | 2,5-dimethylbenzyl | 115-119 |
| 6 | 18 | 2,4,6-trimethylbenzyl chloride | A | 2,4,6-trimethylbenzyl | 132-137 |
| 7 | 120 | 2-iso-propyl-5-nitro-benzyl chloride | A | 2-iso-propyl-5-nitrobenzyl | 129-133 |
| 8 | 70 | Allyl bromide | A | Allyl | 111-121 |
| 9 | 16 | Benzyl bromide | A | Benzyl | 116-121 |
| 10 | 48 | p-Nitrobenzyl bromide | A | p-Nitrobenzyl | 120-128 |
| 11 | 18 | o-Methylbenzyl bromide | A | o-Methylbenzyl | 121-131 |
| 12 | 72 | Crotyl chloride | A | Crotyl | 110-118 |
| 13 | 120 | β-Methylallyl chloride | A | β-Methylallyl | 120-126 |
| 14 | 120 | p-Fluorobenzyl chloride | A | p-Fluorobenzyl | 120-127 |
| 15 | 72 | m-Fluorobenzyl chloride | A | m-Fluorobenzyl | 119-125 |
| 16 | 72 | p-Cyanobenzyl chloride | A | p-Cyanobenzyl | 129-132 |
| 17 | 72 | γ-Idodbutyronitrile | A | γ-Cyanopropyl | 110-118 |
| 18 | 16 | o-Methylbenzyl bromide | B | o-Methylbenzyl | 105-109 |
| 19 | 70 | m-Nitrobenzyl chloride | A | m-Nitrobenzyl | 121-128 |
| 20 | 72 | o-Fluorobenzyl chloride | A | o-Fluorobenzyl | 120-123 |
| 21 | 16 | m-Methylbenzyl bromide | B | m-Methylbenzyl | 108-111 |
| 22 | 16 | 3,5-dimethylbenzyl bromide | A | 3,5-dimethylbenzyl | 135-147 |
| 23 | 72 | p-tert-Butylbenzyl chloride | A | p-tert-Butylbenzyl | 139-142 |
| 24 | 72 | 1-chloromethyl-naphthalene | A | α-(1-methylnaphthyl) | 141-144 |
| 25 | 264 | m-tert-Butylbenzyl chloride | A | m-tert-Butylbenzyl | 126-128 |
| 26 | 960 | o-Nitrobenzyl chloride | A | o-Nitrobenzyl | 105-107 |
| 27 | 240 | Propargyl chloride | A | Propargyl | 120-123 |
| 28 | 144 | m-Methoxybenzyl chloride | A | m-Methoxybenzyl | 124-129 |
| 29 | 72 | 3,5-di-tert-butylbenzyl bromide | A | 3,5-di-tert-butylbenzyl | 130-137 |
| 30 | 240 | 2-methyl-5-nitro-benzyl chloride | A | (2-methyl-5-nitro)benzyl | 128-130 |
| 31 | 18 | 3-chloropropenylbenzene | A | 3-(1-phenylpropenyl) | 133-139 |
| 32 | 18 | m-Methyloxymethylbenzyl bromide | A | m-Methoxy methylbenzyl | 114-116 |
| 33 | 768 | Phenethyl-p-toluenesulfonate | A | Phenethyl | 113-116 |
| 34 | 18 | tert-Butyl plus bromoacetate | A | tert-Butylglycyl | 203-207 |
| 35 | 312 | Benzyl-m-chloromethylbenzoate | A | m-(Carbobenzyloxy)benzyl | |
| 36 | 120 | α,α-Dichloro-p-xylene | A | p-Chloromethylbenzyl | |

EXAMPLE 37 m-Methoxymethylbenzyl bromide

The reactant for Example 32 was made as follows. To a solution of 20.0 g. (75.7 mmole) α,α'-dibromo-m-xylene was added a methanolic sodium methoxide solution prepared from 1.74 g. (75.7 mmole) of sodium and 100 ml. of methanol. The mixture was warmed to reflux while the pH was frequently checked. After 15 minutes at reflux the pH was 7.0 and the mixture was cooled in an ice-bath, and then poured into 2.4 liters of water. The product was extracted with 1× 200 and 2× 100 ml. portions of chloroform. The combined chloroform layers were washed with 2× 100 ml. portions of water, were dried over sodium sulfate, and were evaporated. The residue (19.71 g.) was fractionally distilled through a 50 cm. Podbielniak column at 12.5 mm. Hg.

EXAMPLE 38

De(N-methyl)-N-m-aminobenzyl erythromycin A

A 2.03 g. (2.38 mmole) sample of de(N-methyl)-N-m-nitrobenzylerythromycin A was dissolved in 250 ml. of ethanol. Raney nickel (2.0 g.) was added and the mixture was placed on a Parr shaker under a hydrogen atmosphere of 35 p.s.i. The theoretical uptake of hydrogen was observed in 1 hour. The catalyst was removed by filtration and the ethanol was evaporated to leave a glassy residue. The sample was purified by chromatography on 70 g. of Florisil using the procedure described in Example 1. Thin layer chromatography showed a single spot, but the sample could not be obtained in crystalline form. The infrared showed carbonyl absorptions at 1725 (lactone) and 1690 cm.$^{-1}$ (ketone).

Analysis.—Calc. for $C_{43}H_{72}N_2O_{13}$ (825.060) (percent): C, 62.60; H, 8.80; N, 3.39; O, 25.21. Found (percent): C, 62.68; H, 8.95; N, 3.40; O, 25.41.

In a similar manner to m-aminobenzyl, the (2-isopropyl-5-amino)benzyl; (2-methyl-5-amino)benzyl; p-aminobenzyl; and o-aminobenzyl-N-substituted derivatives of de-N-methyl erythromycin A or B can be prepared by reduction of the corresponding nitro derivatives.

EXAMPLE 39

De(N-methyl)-N-p-[(dimethylamino)methyl]-benzyl erythromycin A

Dimethylamine was bubbled into 300 ml. of absolute methanol until the increase in weight reached 10 g. The product of Example 36 (8.59 g.) was dissolved in this mixture and allowed to stand at 25° for 3 hours. The mixture was then diluted with 1500 ml. of water and the product was extracted with 4× 100 ml. portions of chloroform. The combined chloroform layers were washed with 250 ml. of water containing 15 ml. of concentrated ammonium hydroxide, were dried over sodium sulfate, and were evaporated to give 7.52 g. of crude product.

This material was purified in stages by column chromatography. Initially, the product was chromatographed on a column of 280 g. of Florisil prepared in benzene. Fractions of 250 ml. were collected and all eluents also contained 0.3% triethylamine.

The combined fractions of the first chromatography were individually examined by thin layer chromatography and those sufficiently enriched in the product were rechromatographed. For example, combined fractions 47-51 contained predominantly the product along with three other nonpolar compounds. This material (0.85 g.) was chromatographed on a 70 g. column of Florisil prepared in benzene. Triethylamine (0.3%) was not added until the nonpolar compound had been eluted. Fractions were cut at 125 ml.

Fraction 20 was pure and was dissolved in 4.5 ml. of ethanol and crystallized on standing after 6 ml. of water was added to give 0.21 g. of de(N-methyl)-N-p-[(dimethylamino)-methyl]benzyl erythromycin A, M.P. 126-128°.

Analysis. — Calc. for $C_{46}H_{78}N_2O_{13}$ (867.142) (percent): C, 63.72; H, 9.07; N, 3.23; O, 23.98. Found (percent): C, 63.66; H, 8.86; N, 3.13; O, 23.69.

In a similar manner combined fractions 52-57, 58-64, 65-70 and 71-76 were purified to give 1.2 g. of additional material.

Likewise, other diloweralkylamines including diethylamine, methyl ethylamine propylethylamine and the like can be reacted with de(N-methyl)-N-methylbenzylerythromycin A or B. Such products include:

de-N-methyl-N-m-[(diethylamino)-methyl]benzylerythromycin B
de-N-methyl-N-p-[(methylethylamino)-methyl]-benzylerythromycin B
de-N-methyl-N-o-[(methylpropylamino)-methyl]-benzylerythromycin B
de-N-methyl-N-p-[(dipropylamino)-methyl]-benzylerythromycin A

EXAMPLE 40

De(N-methyl)-N-m-(dimethylamino)benzyl-erythromycin A

A solution of 2.24 g. of de(N-methyl)-N-m-aminobenzylerythromycin A was prepared in 150 ml. of ethanol and 4.5 ml. of formalin and 2.2 g. of 5% platinum on charcoal was added. The mixture was placed on a Parr shaker under a hydrogen atmosphere of 47 p.s.i. The theoretical uptake of hydrogen was observed in 24 hours. The catalyst was removed by filtration and the ethanol was evaporated to leave 2.70 g. of residue. The sample was purified by chomatography on 70 g. column of Florisil, prepared in benzene and made basic by eluting with 1.01 of benzene: 0.3% triethylamine. All eluents contained 0.1% triethylamine and fractions were cut at 125 ml. Elution of the column was conducted with benzene containing increasing percentages of ethyl acetate to a maximum of 20%. The appropriate fractions were combined and de(N - methyl) - N - m - (dimethylamino) benzylerythromycin A was crystallized from ethanol water.

The sample analyzed satisfactorily for a compound of the formula $C_{45}H_{76}N_2O_{13}$ (mole wt. 853.115).

EXAMPLE 41

Benzyl m-chloromethylbenzoate

To a mixture of 6.0 ml. of benzyl alcohol and 6.4 ml. of dry pyridine in 100 ml. of benzene was added a solution of 10.0 g. (52.8 mmole) of m-chloromethylbenzoyl chloride in 50 ml. of benzene during 10 minutes. The mixture became warm for a period and was allowed to stand at 25° for 20 hours. The mixture was then washed with 100 ml. of water, followed by 4× 50 ml. of 1.2 N hydrochloric acid and finally with 50 ml. of water. The benzene was dried over sodium sulfate and evaporated to give 15.40 g. of crude product. The sample was distilled through a 50 cm. Podbielniak column to give 11.0 g. of benzyl m-chloromethylbenzoyl chloride, B.P. 187.5–188.5° at 2.3 mm. Hg.

EXAMPLE 42

De(N-methyl)-N-m-(carbobenzyloxy)benzyl-erythromycin A

To a mixture of 2.00 g. (2.78 mmole) of de(N-methyl)erythromycin A and 1.51 g. (11.1 mmole) of sodium acetate trihydrate dissolved in 20 ml. of absolute methanol was added 1.45 g. (5.55 mmole) of benzyl m-chloromethylbenzoate. The mixture was sitted at 25° for 13 days and then poured into 250 ml. of water made basic with 5 ml. of concentrated ammonium hydroxide. The mixture was extracted with 4× 35 ml. portions of chloroform. The combined chloroform layers were washed with 100 ml. of water containing 5 ml. of concentrated ammonium hydroxide, were dried over anhydrous sodium sulfate, and were concentrated to give 4.27 g. of crude product mixture which was immediately purified by chromatography.

A column of 70 g. of Florisil was prepared in benzene and made basic by eluting with 1.0 liters of benzene: 0.3% triethylamine. Fraction sizes were 125 ml. and all eluents contained 0.3% triethylamine.

EXAMPLE 43

De(N-methyl)-N-m-carboxybenzyl-erythromycin A

To a solution of 2.80 g. (2.96 mmole) of de(N-methyl)-N-m-(carbobenzyloxy)benzylerythromycin A in 50 ml. of ethanol was added 0.15 g. of 5% palladium on charcoal. The suspension was stirred at 25° under hydrogen at one atmosphere pressure. The theoretical amount of hydrogen was consumed in 5 hours. The catalyst was removed by filtration and the ethanol was evaporated. The residue was crystallized twice from chloroform to give 0.43 g. of de(N-methyl)-N-m-carboxybenzylerythromycin A, M.P. 151–153°.

I claim:

1. A compound of the formula

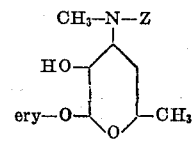

wherein Z is:

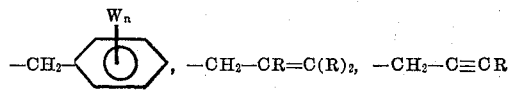

and $$—(CH_2)_n—CN$$

where W is one or more similar or dissimilar members selected from the group consisting of halogen, cyano, loweralkyl, nitro, amino, carboxybenzyl, loweralkoxy, haloloweralkyl, carboxyl, diloweralkylaminomethyl, diloweralkylamino, loweralkoxymethyl, and when substituted on adjacent carbons of the benzyl ring, two W groups are 1,3-butadienylene; R is hydrogen, phenyl, and loweralkyl; ery is the cladinose and erythronolide moieties of erythromycin A and B; and $n$ is an integer of from 0–3 inclusive.

2. A compound according to claim 1 in which Z is $—(CH_2)_n—CN$.

3. A compound according to claim 1 in which Z is $—CH_2—CH\equiv CR$.

4. A compound according to claim 1 in which Z is $—CH_2—CR=C(R)_2$.

5. A compound according to claim 1 in which Z is

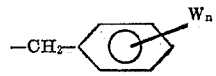

6. A compound according to claim 1 in which W is halogen, cyano, loweralkyl, nitro, carboxybenzyl, loweralkoxy, haloloweralkyl, carboxyl, loweralkoxymethyl, and when substituted on adjacent carbon atoms of the benzyl ring, two W groups are 1,3-butadienylene.

7. A compound according to claim 1 in which W is amino, diloweralkylamino and diloweralkylaminomethyl.

8. A compound according to claim 1 in which $n$ is 0, and R is hydrogen.

References Cited

UNITED STATES PATENTS 2,812,323  11/1957  Flynn et al. _____ 260—210 E
3,597,415  8/1971  Sinkula _____ 260—210 E LEWIS GOTTS, Primary Examiner J. R. BROWN, Assistant Examiner U.S. Cl. X.R.

260—999

UNITED STATES PATENT OFFICE
CERTIFICATE OF CORRECTION

Patent No.  3,681,325               Dated   August 1, 1972

Inventor(s)  Leslie Alan Freiberg

It is certified that error appears in the above-identified patent and that said Letters Patent are hereby corrected as shown below:

In Claim 3, please delete the formula

and substitute therefor

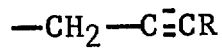

Signed and sealed this 24th day of April 1973.

(SEAL)
Attest:

EDWARD M. FLETCHER, JR.                ROBERT GOTTSCHALK
Attesting Officer                       Commissioner of Patents